United States Patent [19]

Thouret et al.

[11] Patent Number: 4,591,752
[45] Date of Patent: May 27, 1986

[54] INCANDESCENT LAMP WITH HIGH PRESSURE RARE GAS FILLED TUNGSTEN-HALOGEN ELEMENT AND TRANSPARENT THICK WALLED SAFETY ENVELOPE

[75] Inventors: Wolfgang E. Thouret, Verona; Rudolph Kaufman, North Bergen; Harry Kee, Dumont, all of N.J.

[73] Assignee: Duro-Test Corporation, North Bergen, N.J.

[21] Appl. No.: 541,997

[22] Filed: Oct. 14, 1983

[51] Int. Cl.$^4$ .............................................. H01K 1/34
[52] U.S. Cl. ..................................... 313/25; 313/579; 313/113; 313/312
[58] Field of Search ................. 313/25, 579, 112, 113, 313/580, 569, 570, 312

[56] References Cited

U.S. PATENT DOCUMENTS

| | | |
|---|---|---|
| 2,891,189 | 6/1959 | Bud et al. ............................ 313/569 |
| 3,138,731 | 6/1964 | Beese ............................... 313/312 X |
| 3,418,512 | 12/1968 | T'jampens et al. ................. 313/569 |
| 3,869,631 | 3/1975 | Anderson et al. .............. 313/578 X |
| 4,017,758 | 4/1977 | Almer et al. .................... 313/580 X |
| 4,338,540 | 7/1982 | Sovilla ................................ 313/579 |
| 4,366,409 | 12/1982 | Nieda et al. ......................... 313/569 |

Primary Examiner—Palmer C. DeMeo
Assistant Examiner—K. Wieder
Attorney, Agent, or Firm—Darby & Darby

[57] ABSTRACT

An incandescent lamp unit in which a light emitting element of the tungsten-halogen type is placed within an outer, safety protecting transparent envelope. The element, being protected by the outer envelope, is filled with a gas at a high pressure, thereby increasing its efficiency, and the space between the element and the outer envelope is also preferably filled with a gas having good heat conductivity properties. The outer envelope also can have a coating of a material which transmits visible range energy and reflects infrared energy.

19 Claims, 3 Drawing Figures

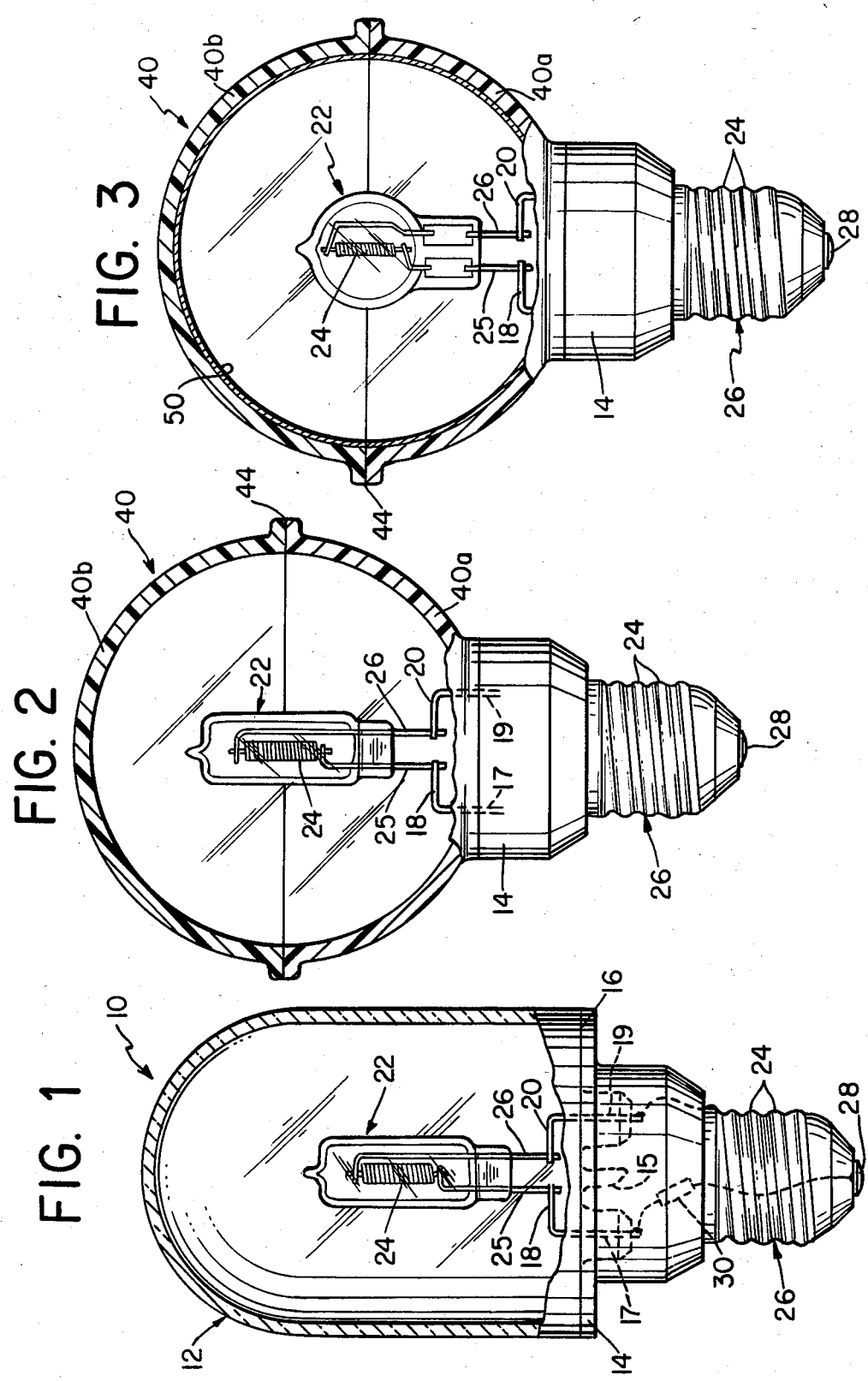

INCANDESCENT LAMP WITH HIGH PRESSURE RARE GAS FILLED TUNGSTEN-HALOGEN ELEMENT AND TRANSPARENT THICK WALLED SAFETY ENVELOPE

The technology of manufacturing tungsten-halogen lamps, i.e. lamps with an incandescent filament and a halogen scavenger, which are also called quartz-halogen or QUARTZLINE lamps, has improved substantially in recent years. The main advantages of these lamps over regular incandescent lamps are much higher luminous efficacy at the same life rating and extremely compact envelope dimensions.

During the first years after their introduction, tungsten-halogen lamps could be made only with envelopes of quartz glass or quartz-related materials and for relatively high wattages, typically 250 watts and above for standard line voltages, because the chemical effects created by the halogen addition to the fill gas required a certain minimum thickness of the tungsten filament wire. The present state of the art of mass-producing such lamps allows use of certain types of hard glass as envelope materials and the manufacture of tungsten-halogen elements, i.e. the envelope containing the filament and the gas, of very small dimensions for low wattages in the 35 to 80 watt range to be operated at voltages between 80 and 130 volt. Using hard glass instead of fused quartz simplifies production and results in substantial cost reduction. The possibility of making tungsten-halogen elements operable at low wattages and at standard line voltages suggests the use of these lamps for general lighting service.

The small envelope dimensions of low wattage tungsten-halogen elements facilitates the use of very high rare gas fill pressures, for example, up to 15 atmospheres cold and 75 atmospheres in operation. At such pressures, the rare gases, often Krypton and Xenon, due to their high atomic weight and their low thermal conductivity permit obtaining very high luminous efficacy values and long average rated life from compact coiled coil tungsten filaments.

For example, in the 60 watt range, luminous efficacies of 19 to 22 lumens per watt can be achieved at life ratings of 2000 to 2500 hours or luminous efficacies of 22 to 25 lumens per watt at 1000 hour life rating. These data represent 40 to 60% increased luminous efficiencies at unchanged life rating when compared to standard argon-filled incandescent lamps in the same wattage range. In other terms, energy savings of 25 to 40% can be obtained with lamps of 45 to 75 watt input that have lumen outputs comparable to those produced by standard argon-filled incandescent lamps in the 75 to 100 watt range. Such energy savings are typically three to four times the amounts presently saved by the Krypton-filled general lighting service incandescent lamps marketed by many leading lamp manufacturers for the purpose of saving energy. See W. E. Thouret, H. A. Anderson and R. Kaufman, "Krypton Filled Large Incandescent Lamps", Illuminating Engineering, Vol. 65, p. 231, April 1970; W. E. Thouret, R. Kaufman and J. W. Orlando, Energy and Cost Saving Krypton Filled Incandescent Lamps, J. Illuminating Engineering Society, Vol. 4, p. 188, April 1975.

Accordingly, for energy conserving purposes, low wattage tungsten-halogen elements with small dimensions and rare gas filling of extremely high pressure would be highly useful as highly efficient sources for general lighting if they are built into units with all the convenience and safety features of regular incandescent lamps. It is the purpose of this invention to provide such units which so far do not appear to have been proposed or made available.

U.S. Pat. No. 3,243,634 to F. A. Mosby suggests enclosing a tungsten-halogen element filled with rare gas at a pressure of preferably at least several hundred millimeters of mercury, and even exceeding atmospheric, with an outer envelope of conventional size, shape and glass material carrying a conventional screw base. The outer envelope has an open neck portion to which the base is attached and it is not evacuated or filled with any special gas. The lamp of this patent overlooks the fact that a tungsten-halogen element should be filled with extremely high rare gas pressure in order to achieve optimum luminous efficacy and life rating. Therefore, since only a conventional thin-walled outer envelope is disclosed in this patent, a serious safety hazard can be present if the element explodes. It also overlooks the fact that the performance data of a high pressure filled tungsten-halogen element with small dimensions can be essentially improved by surrounding it with a gas filling of high thermal conductivity which cools its surface through heat conduction-convection.

According to the present invention, a tungsten-halogen lamp has an element which is filled with at least 6 atmospheres of rare gas at room temperature, but preferably filled to much higher pressure of Krypton or Xenon. The element is mounted within a fully transparent glass or plastic envelope that is mechanically strong enough to contain the particles from the tungsten-halogen element in case it should shatter or explode.

It is therefore an object of the present invention to provide an improved tungsten-halogen lamp.

Another object is to provide a tungsten-halogen lamp having an element with a high fill gas pressure which is mounted within a mechanically strong transparent envelope.

A further object is to provide a tungsten-halogen lamp having an element with a high fill gas pressure which is mounted within mechanically strong transparent envelope which includes a heat conductive gas in the space between the element and the outer envelope.

Other objects and advantages of the present invention will become more apparent upon reference to the following specification and annexed drawings in which:

FIG. 1 is an elevational view of one embodiment of the invention;

FIG. 2 is an elevational view of a second embodiment; and

FIG. 3 is an elevational view of a further embodiment.

FIG. 1 shows a unit 10 according to the invention that has an outer envelope 12 with cylindrically shaped lower portion and a semi-spherical dome. Envelope 12 is made of pressed glass or a fully transparent plastic material such as PLEXIGLAS or LUCITE, which can be molded. It also includes a disc shaped base 14. The envelope 12 and its base 14 are joined vacuum tight at a rim 16, through fusing or by a high temperature resistant adhesive. The disc 14 has a tubulation tip 15 through which the interior of the envelope is filled with a suitable gas.

Two electrical lead-in studs 17,19 are sealed in a vacuum tight manner into the disc 14. A respective stiff lead-in wire 18,20 is sealed into each stud in a vacuum tight manner. A tungsten-halogen element 22 having a filament 24 and lead wires 25,26 is mounted and electrically connected to the lead-in wires 18,20. The filament is preferably of tungsten and is of the compact coiled-coil type. The element also contains a halogen scavenger such as chlorine, bromine or iodine as is conventional in such lamps. The envelope of element 22 is of a suitable material such as an alumo-borosilicate hard glass. It has a minimum wall thickness of 1.5 mm (or 0.060") in order to reliably withstand the internal gas pressure of up to about 36 atmospheres in operation, corresponding to a cold fill pressure of 12 atmospheres. The fill gas of the tungsten-halogen element is preferably Xenon although Krypton may be used. Higher gas pressures also may be used, for example up to about 15 atmospheres cold, depending upon the structural strength of the envelope of the element as well as that of the outer envelope 12.

The main purpose of the fully transparent thick-walled outer envelope is to provide safety in case of explosion of the tungsten-halogen element. For this purpose it does not have to be hermetically sealed or evacuated. However, if it is hermetically sealed and filled with a gas of high heat conductivity, for example, nitrogen, helium or hydrogen, it can provide heat conduction-convection cooling for the small envelope of the tungsten-halogen element 22. By surrounding the tungsten-halogen element with a gas of high heat conductivity, the specific surface loading in watt/cm$^2$ or watt/inch$^2$ of its glass or quartz envelope can be essentially increased and its dimensions thereby decreased. Thus, it is preferred that the outer envelope be capable of withstanding a high internal fill pressure. Helium or hydrogen can be used as fill gas of the outer envelope if the envelope of the tungsten-halogen element is not permeable by these gases at its very high operating temperature.

The transparent outer envelope 12 will serve its purpose best in many applications if it is given the shape and outer dimensions of the commonly used glass envelopes for regular general lighting incandescent lamps of the particular wattage or lumen output. It may be most suitable to dimension the outer envelope according to the lamp wattage, because, on the basis of the substantially higher luminous efficacy of the tungsten-halogen element, the outer envelope can be considerably smaller than a conventional light bulb of the same lumen output which would require much greater wattage.

If the safety envelope 12 is made of glass, its minimum wall thickness over the entire surface must be at least 0.080", or 2 millimeter when a cold pressure of about 12 atmospheres and an operating pressure of about 36 atmospheres is in the tungsten-halogen element. For higher pressures, the wall thickness of envelope 12 is increased accordingly. If the envelope 12 is of plastic, its wall thickness is made sufficiently thick to withstand the explosion pressure of the element. Experiments have shown that conventional incandescent lamp envelopes of blown glass with a thinner wall cannot consistently withstand the impact of an exploding tungsten-halogen element even if this is filled only to approximately 3 atmospheres rare gas pressure cold, equivalent to about 9 atmospheres when in operation.

In a preferred embodiment, the outer envelope 12 is hermetically sealed and is filled with approximately 600 Torr of nitrogen, when the lamp unit is cold, through the exhaust tubulation 15. Higher fill pressures can be used, for example, up to and including about 3 atmospheres, when the lamp unit is cold. The lead-in wires 18,20 of the outer envelope are connected electrically to the thread 27 and the bottom contact 28 of a screw base in the usual manner. A PN-junction diode 30 is connected between the lead-in wire 18 and the bottom base contact 28. The diode converts the external regular supply voltage of 120 volts to an operating voltage of approximately 84 volts for the tungsten-halogen element filament 24. Due to this approximately 30% lower operating voltage, the compact coiled-coil filament 24 can be designed for about 40% greater operating current with correspondingly thicker tungsten wire. This contributes to substantial performance improvements of the tungsten-halogen element.

The data of the lamp of FIG. 1 are approximately as follows:
Wattage input: 60 watts
External supply voltage: 120 volts
Initial lumen output: 1150 lumens
Luminous efficacy: 19.3 lumens per watt
Average rated life: 2500 hours This represents an increase in luminous efficacy of 40% and an energy saving of 27% over conventional incandescent lamps of the same lumen output and the same life rating. A conventionally constructed extended service lamp with 2500 hours life rating would require an input of approximately 82 watts in order to produce 1160 initial lumens.

The thick-walled fully transparent safety envelope of the lamp unit just described does not have to have the shape and dimensions of the commonly used glass envelopes for regular incandescent light bulbs. Its shape and size can be adapted to any particular purposes as long as it meets the requirements of having sufficient mechanical strength for safely containing the particles of an exploding high pressure filled tungsten-halogen element.

FIG. 2 shows another unit according to the invention. The same reference numerals are used as in the preceding embodiment. This unit has a spherically or slightly ellipsoidally shaped safety envelope 40 made of pressed glass or a fully transparent plastic material like PLEXIGLAS or LUCITE. The envelope 40 is formed of two parts 40a and 40b which are hemispheres or hemi-ellipsoids and which are joined in a vacuum tight manner at a rim 44 through fusing or by a high temperature resistant adhesive. The bottom hemisphere, or hemi-ellipsoid, 40a carries the two vacuum tight sealed electrical lead-in studs 17,19. The envelope 40 is also preferably filled with a high heat conductivity gas as previously described.

A tungsten-halogen element 22 is mounted and electrically connected to the lead-in studs 17,19. The envelope of the tungsten-halogen element 22 preferably is of an alumoborosilicate hard glass. It has a minimum wall thickness of 0.060" or 1.5 mm in order to withstand reliably the internal pressure of approximately 27 atmospheres in operation, corresponding to a cold fill pressure of 9 atmospheres.

The fill pressure of the tungsten-halogen element of the lamp of FIG. 2 is lower than that of the unit shown in FIG. 1 because it is designed for a higher wattage without change of dimensions. When hard glass or quartz glass lamp envelopes are designed that have to operate reliably at high termperatures under high internal gas pressure, two different stress conditions have to be taken into account. These are the tensile stress condition caused by the internal gas pressure and the thermal stresses resulting from the temperature differences created during operation. (See: W. E. Thouret, Tensile and Thermal Stresses in the Envelope of High Brightness High Pressure Discharge Lamps,, Illuminating Engineering, Vol. LV, page 295, May 1960.) While the tensile stresses are roughly proportionate to the internal operating pressure, the thermal stress condition increases with the specific surface loading in watts per square inch or watts/cm$^2$. Consequently, the operating pressure has to be reduced somewhat if the input wattage is increased without change of dimensions.

The data of the lamp in FIG. 2 is approximately as follows:

Wattage input: 100 watts
External supply voltage: 120 watts
Initial lumen output: 2350 lumens
Luminous efficacy: 23.5 lumens per watt
Average rated life: 2500 hours This represents an increase in luminous efficacy of 49% and an energy saving of 33% over conventional incandescent lamps of the same lumen output and the same life rating. A conventionally constructed extended service lamp with 2500 hours life rating would require an input of 150 watts in order to produce 2350 initial lumens.

The energy savings achieved by a unit according to the invention can be augmented by placing a transparent heat mirror on the inner surface of the outer envelope. Such heat mirror transmits most of the visible radiation produced by the tungsten-halogen element and reflects infrared energy. The heat mirror coating is shown in FIG. 3 by the reference numeral 50. Due to the spherical shape of envelope 44 and the optical properties of the spherical or ellipsoidal envelope, infrared energy will be reflected back to the filament. This raises its temperature and thereby decreases the energy needed to heat it to its operating temperature. Thus, the coating utilizes substantial infrared energy which is otherwise normally wasted. The construction and manufacture of heat mirror equipped energy saving incandescent lamps have been described in patents and other publications. (L. Thorington, et al.: U.S. Pat. No. 4,160,929; J. Brett, et al.: Radiation Conserving Incandescent Lamps, Journal of IESNA, Vol. IX, p. 197, July 1980; J. Brett, et al: Development of Energy Conserving Incandescent Lamps, Journal of IESNA, Vol. X, p. 214, July 1981.

Numerically, the energy savings obtainable by non-tungsten-halogen incandescent lamps with a transparent heat mirror coating can reach 50% of the input wattage and their luminous efficacy can be increased by nearly 100%. If in a heat mirror lamp the standard filament arrangement is replaced by a high pressure filled tungsten-halogen element the wattage savings and efficacy improvements due to the heat mirror system and the tungsten-halogen element are not simply additive. The heat mirror system is less effective because the filament of the tungsten-halogen element operates at much higher temperature than regular filaments and thus produces less infrared loss radiation that can be reflected back. Additionally, the envelope of the tungsten-halogen element creates reflection, absorption and alignment losses that reduce the energy savings achievable by the heat mirror system. The energy savings created by the tungsten-halogen element are also reduced because its visible emission is subject to transmission losses through the heat mirror.

For example, because of these restrictions and limitations, a high pressure tungsten-halogen unit with heat-mirror equipped optically precise safety envelope according to this invention achieves the following performance data:

Wattage input: 55 watts
External supply voltage: 120 volts
Initial lumen output: (output of a standard 100 watt, 750 hour household lamp): 1750 lumens
Luminous efficacy: 32 lumens per watt
Average rated life: 2500 hours This represents an increase in luminous efficacy of 120% and an energy saving of 45% over conventional lamps of the same lumen output and the same life rating. A conventionally constructed extended service lamp with 2500 hours life rating would require an input of approximately 120 watt in order to produce 1750 lumens. An important advantage of using a tungsten-halogen element in combination with a heat mirror system is that the lumen output of the tungsten-halogen element is nearly constant over the life of the filament because no envelope blackening from evaporated tungsten particles occurs. The lumen output of heat mirror lamps with regular filaments is affected by the deposition of evaporating tungsten particles on the heat mirror coated envelope.

FIG. 3 shows an energy saving lamp unit that is equipped with a heat mirror reflective system built into a thick-walled safety envelope and a high pressure tungsten-halogen element. The lamp parts and their reference numerals are essentially the same as in FIGS. 1 and 2. Additionally shown is the heat mirror coating 50 on the inner surface of the outer envelope. The tungsten-halogen element here has a spherical instead of a cylindrical, envelope and this spherical envelope is made of quartz glass or a quartz-related material. This has the advantage of reduced absorption losses in the infrared region. The spherical shape has been chosen to reduce to a minimum the reflection, absorption and aberration losses through the tungsten-halogen envelope. The spherical shape also enables the envelope to withstand higher tensile and thermal stresses than one with cylindrical contours can. A spherical envelope withstands approximately twice the amount of stress sustainable by a cylinder of same diameter and wall thickness.

What is claimed is:

1. A ruggedized, general service tungsten-halogen lamp unit comprising:
   a sealed first envelope of transparent vitreous material having therein an incandescent filament, an amount of a halogen scavenger and a fill gas at a pressure of at least between about 6 and about 12 atmospheres when the lamp unit is inoperative, the material of said first envelope being substantially impervious to the fill gas,
   a sealed transparent outer protective envelope of a material and construction which is mechanically strong enough to withstand explosion of said first envelope surrounding said first envelope,
   and a fill gas having a pressure of at least about 600 torr when the lamp unit is inoperative in the space between said first an outer envelopes to reduce the stresses on the inner envelope.

2. A lamp unit as in claim 1 wherein the fill gas of said first envelope is selected from the group consisting of Xenon and Krypton.

3. A lamp unit as in claim 1 further comprising a fill gas of high heat conductivity in the space between said first envelope and said outer envelope.

4. A lamp unit as in claim 1 wherein said fill gas in the space between the first and inner envelope has a high heat conductivity for cooling said first envelope by convection.

5. A lamp unit as in claim 4 wherein the fill gas in said outer envelope is selected from the group consisting of nitrogen, helium and hydrogen.

6. A lamp unit as in claim 1 wherein the pressure of said fill gas in said outer envelope is between about 600 Torr and about 3 atmospheres in a non-operating condition of the lamp unit.

7. A lamp unit as in claim 6 wherein said fill gas in the space between the first and inner envelope has a high heat conductivity for cooling said first envelope by convection.

8. A lamp unit as in claim 7 wherein the fill gas in the outer envelope is selected from the group consisting of nitrogen, helium and hydrogen.

9. A lamp unit as in claim 1 wherein said outer envelope is in the shape of a cylinder having a part spherical dome at the top.

10. A lamp unit as in claim 1 wherein said outer envelope is generally spherical in shape.

11. A lamp unit as in claim 1 further comprising a coating on said outer envelope which passes a substantial amount of the visible range energy and reflects a substantial amount of the infrared range energy produced by the filament within said first envelope.

12. A lamp unit as in claim 10 wherein said outer envelope is optically shaped to reflect the infrared energy back toward said filament within said first envelope.

13. A lamp unit as in claim 11 wherein said outer envelope is generally spherical.

14. A lamp unit as in claim 11 wherein said outer envelope is generally ellipsoidal.

15. A lamp unit as in claim 12 wherein said first envelope is also optically shaped to reduce losses.

16. A lamp unit as in claim 14 wherein said first envelope is generally spherical.

17. A lamp unit as in claim 1 further comprising a diode for rectifying alternating current supplied to the incandescent filament in said first envelope into pulsating direct current.

18. A lamp unit as in claim 1 wherein said outer envelope has at least a structural strength corresponding to at least that of glass which is 0.080 inches thick.

19. A lamp unit as in claim 1 wherein the thickness of the material of the outer envelope corresponds to at least 1.25 times that of the material of said first envelope whrein the two materials are the same.

* * * * *